(12) United States Patent
Kugelmann et al.

(10) Patent No.: US 12,116,042 B2
(45) Date of Patent: Oct. 15, 2024

(54) METHOD FOR INTRODUCING A MEDIA OUTLET INTO A HOLLOW PROFILED SECTION AND METHOD FOR PROVIDING A HOLLOW PROFILED SECTION

(71) Applicant: Bayerische Motoren Werke Aktiengesellschaft, Munich (DE)

(72) Inventors: Stefan Kugelmann, Munich (DE); Jan Mueller-Brincken, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 328 days.

(21) Appl. No.: 17/787,137

(22) PCT Filed: Dec. 3, 2020

(86) PCT No.: PCT/EP2020/084365
§ 371 (c)(1),
(2) Date: Jun. 17, 2022

(87) PCT Pub. No.: WO2021/139931
PCT Pub. Date: Jul. 15, 2021

(65) Prior Publication Data
US 2023/0026573 A1    Jan. 26, 2023

(30) Foreign Application Priority Data

Jan. 10, 2020    (DE) ............... 10 2020 100 387.0

(51) Int. Cl.
*B62D 25/02*    (2006.01)
*B62D 29/00*    (2006.01)
(Continued)

(52) U.S. Cl.
CPC ......... *B62D 25/025* (2013.01); *B62D 29/008* (2013.01); *C25D 13/14* (2013.01); *C25D 13/22* (2013.01)

(58) Field of Classification Search
CPC ...... C25D 13/22; C25D 13/14; B62D 25/025; B62D 29/008
See application file for complete search history.

(56) References Cited

U.S. PATENT DOCUMENTS

| 2017/0066042 A1 | 3/2017 | Wagner et al. |
| 2017/0158029 A1* | 6/2017 | Eltrop ................. B60H 1/3428 |
| 2018/0257717 A1 | 9/2018 | Horvat et al. |
| 2019/0084497 A1* | 3/2019 | Roth ..................... B60N 2/763 |

FOREIGN PATENT DOCUMENTS

| CN | 105934295 A | 9/2016 |
| CN | 106573526 A | 4/2017 |

(Continued)

OTHER PUBLICATIONS

International Search Report (PCT/ISA/210) issued in PCT Application No. PCT/EP2020/084365 dated Mar. 15, 2021 with English translation (seven (7) pages).

(Continued)

*Primary Examiner* — Bayan Salone
(74) *Attorney, Agent, or Firm* — Crowell & Moring LLP

(57) ABSTRACT

The invention relates to a method for introducing a media outlet (6) into a hollow profiled section (1), in which method a first media outlet passage (7), via which a medium can flow out of a cavity (2) in the hollow profiled section (1), is introduced by means of a first tool into an outer wall (5) of the hollow profiled section (1), and in which method a second tool is introduced into the cavity (2) in the hollow profiled section (1) via the first media outlet passage (7), and by means of said second tool at least one second media outlet passage (8) is introduced into an inner profiled section web (4) of the hollow profiled section (1). The invention further relates to a method for providing a hollow profiled section (1), in which the hollow profiled section (1) is extruded and a media passage (6) is introduced into the hollow profiled section (1) in a method according to any of (Continued)

the preceding claims, a geometry of the profiled section web (4) being selected depending on a position of the first media outlet passage (7) and the hollow profiled section (1) being extruded with the selected geometry of the profiled section web (4).

8 Claims, 1 Drawing Sheet

(51) Int. Cl.
*C25D 13/14* (2006.01)
*C25D 13/22* (2006.01)

(56) References Cited

FOREIGN PATENT DOCUMENTS

| CN | 107848575 A | 3/2018 | | |
|---|---|---|---|---|
| CN | 108602460 A | 9/2018 | | |
| DE | 196 42 970 A1 | 4/1997 | | |
| DE | 196 43 082 A1 | 4/1997 | | |
| DE | 101 16 242 A1 | 11/2002 | | |
| DE | 102009024622 A1 | * 1/2010 | ........... | B62D 25/088 |
| DE | 102011103762 A1 | * 12/2012 | ............. | B62D 25/02 |
| DE | 102015204917 A1 | * 9/2016 | | |
| DE | 10 2018 213 526 A1 | 2/2020 | | |
| WO | WO 2012/095576 A1 | 7/2012 | | |

OTHER PUBLICATIONS

German-language Written Opinion (PCT/ISA/237) issued in PCT Application No. PCT/EP2020/084365 dated Mar. 15, 2021 (seven (7) pages).

German-language Search Report issued in German Application No. 10 2020 100 387.0 dated Dec. 22, 2020 with partial English translation (11 pages).

English translation of Chinese-language Office Action issued in Chinese Application No. 202080078111.8 dated Dec. 28, 2023 (6 pages).

* cited by examiner

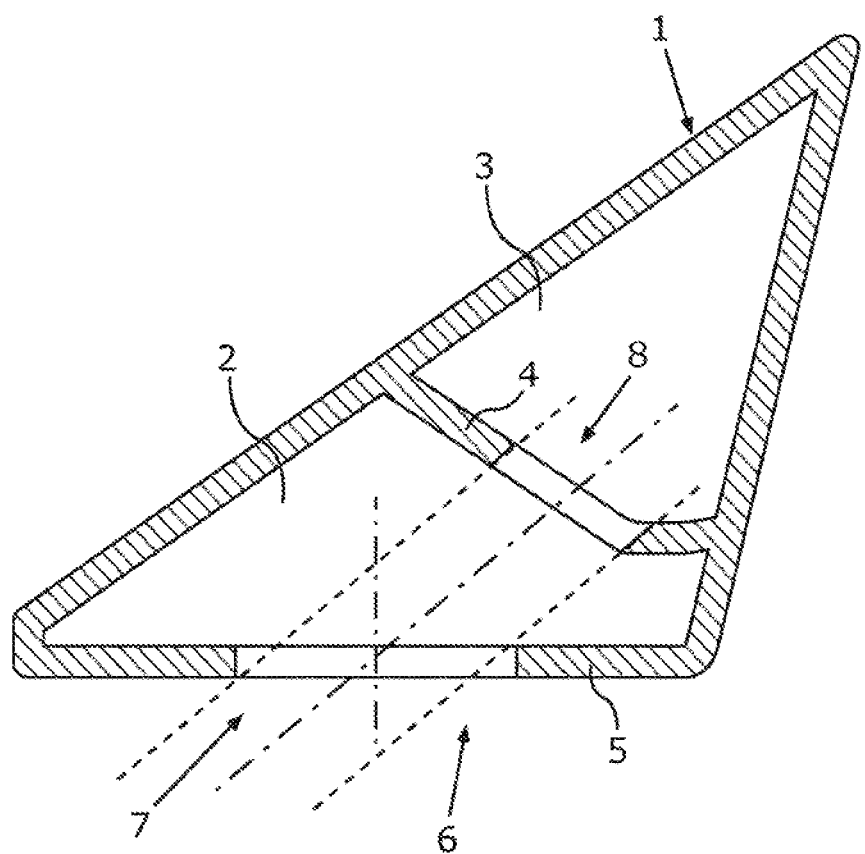

METHOD FOR INTRODUCING A MEDIA OUTLET INTO A HOLLOW PROFILED SECTION AND METHOD FOR PROVIDING A HOLLOW PROFILED SECTION

BACKGROUND AND SUMMARY

The invention relates to a method for forming a media outlet in a hollow profile, and to a method for providing a hollow profile.

DE 10 2011 103 762 A1 has disclosed a longitudinal-member arrangement of a motor-vehicle body, in the case of which a water-outlet device, in particular in the form of an outlet valve, is provided on a side-wall outer plate, and on an inner profile plate at a lower end of a hollow-chamber profile in the vehicle vertical direction. By means of such water-outlet devices, it is possible for liquid entering cavities of the longitudinal-member arrangement in a dip-painting process to be drained away after painting of the longitudinal-member arrangement has taken place.

It is an object of the present invention to provide a method for forming a media outlet in a hollow profile and also a method for providing a hollow profile, which allow particularly simple formation of the media outlet and also particularly complete drainage of a medium from the hollow profile.

Said object is achieved according to the invention by a method for forming a media outlet in a hollow profile and by a method for providing a hollow profile in accordance with the independent claims.

A first aspect of the invention relates to a method for forming a media outlet in a hollow profile, wherein the hollow profile is in particular a motor-vehicle component. In the method, it is provided that a first media-outlet passage is formed in an outer wall of the hollow profile by means of a first tool, via which first media-outlet passage a medium can flow out of a first cavity of the hollow profile. In the method, it is furthermore provided that a second tool is introduced into the first cavity of the hollow profile via the first media-outlet passage, by means of which second tool at least one second media-outlet passage is formed in an inner profile web of the hollow profile. A second cavity of the hollow profile can at least regionally be separated off from the first cavity by means of the profile web. The profile web can be flowed through by the medium via the at least one second media-outlet passage, so that the medium can flow from the second cavity into the first cavity and can flow out of the hollow profile via the first media-outlet passage. In this way, the medium can be discharged from the hollow profile particularly advantageously. In particular, the media-outlet passages allow particularly complete drainage of the medium from the hollow profile, so that the hollow profile can particularly advantageously be made dry.

In one refinement of the invention, it is provided that the first media-outlet passage is formed in the outer wall in a lowermost region of the outer wall, and the at least one second media-outlet passage is formed in the profile web in a lowermost region of the profile web. In this case, the in each case lowermost region results according to an installation position of the hollow profile. Owing to gravitational force, fluid situated in the hollow profile, provided that it is heavier than air, accumulates in the in each case lowermost regions. An arrangement of the respective media-outlet passage in the respective lowermost region of the profile web or of the outer wall allows particularly complete drainage of the medium from the hollow profile in that the medium flows out of the hollow profile via the media-outlet passages.

It has proven to be further advantageous if the first media-outlet passage and the at least one second media-outlet passage are formed in the hollow profile with their respective central axes oblique to one another. The respective central axes of the media-outlet passages are consequently oriented neither coaxially nor parallel with respect to one another. In this way, a respective optimum arrangement of the media-outlet passages at the outer wall and on the profile web can be selected to allow particularly complete emptying of the hollow profile of the medium. As a result of the oblique orientation of the central axes of the media-outlet passages relative to one another, an in each case optimum position for the respective media-outlet passages can be selected and in particular an arrangement of the respective media-outlet passages in the lowermost regions of the profile web and the outer wall can be made possible. Furthermore, an oblique arrangement of the media-outlet passages to one another such that their central axes are oblique to one another makes it possible for the first media-outlet passage to be able to be formed in the outer wall with its central axis at least substantially perpendicular to the outer wall, whereby a cross section of the first media-outlet passage can be kept particularly small. Consequently, the first media-outlet passage is, with its cross section, formed to be large enough to allow the second tool to be introduced into the first cavity. At the same time, the first media-outlet passage is, with its cross section, formed to be as small as possible to ensure particularly high stability of the hollow profile.

In a further configuration of the invention, it is provided that the at least one second media-outlet passage is formed in the profile web with a smaller cross section than what the first media-outlet passage in the outer wall has. In particular, the cross section of the first media-outlet passage in the outer wall is selected according to an outer diameter of the second tool, so as to ensure that the second tool can be introduced into the cavity through the first media-outlet passage. The cross section of the second media-outlet passage can be selected according to an amount of medium to flow out via the second media-outlet passage. In this case, the cross section of the second media-outlet passage is in particular selected to be particularly small, so as to ensure particularly high stability of the hollow profile. The larger configuration, in terms of its cross section, of the first media-outlet passage in comparison with the at least one second media-outlet passage makes it possible for the second tool to be introduced into the hollow profile through the first media-outlet passage, whereby the media-outlet passages can be oriented with their respective central axes oblique to one another. In this way, it is advantageously possible for the second media-outlet passage to be formed in the profile web at positions of the profile web that are normally poorly accessible.

In a further configuration of the invention, it has proven to be advantageous if multiple second media-outlet passages are formed in the profile web. In other words, the second tool is introduced into the cavity through the first media-outlet passage and, by means of the second tool, the multiple second media-outlet passages are formed in the profile web. The multiple second media-outlet passages are arranged spaced apart from one another in the profile web. In particular, if the profile web has multiple hollows in which the medium can accumulate, it is advantageous for each hollow to be assigned at least one second media-outlet passage in its lowermost region. Via the respective second media-outlet passages, it can thus be ensured that the medium can flow out of each of the hollows of the profile web into the cavity and can flow out of the hollow profile via the first media-outlet passage. In this way, the hollow profile can be freed of the medium in a particularly reliable and particularly complete manner via the media-outlet passages.

In a further configuration of the invention, it has proven to be advantageous if the at least one second media-outlet passage is formed in the profile web via four-axis machining, or via five-axis machining, by means of the second tool. Alternatively, the hollow profile may be machined in different chucking operations by means of a conventional 3-axis milling machine or a drilling machine. Four-axis machining and five-axis machining are respective chip-removing machining processes. Here, the expressions four-axle and five-axle indicate a number of directions in which the second tool can be moved. In this case, the respective axes may describe translational movements along the spatial directions and also rotational movements about the spatial directions. Four-axis machining and, in particular, five-axis machining allow a particularly flexible movement of the second tool, whereby a particularly large number of different relative positions of the first media-outlet passage and of the second media-outlet passage with respect to one another can be realized. In this way, an arrangement of the respective media-outlet passages at respective lowermost regions of the profile web or of the outer wall can be ensured, which makes it possible for the hollow profile to be made dry in a particularly reliable and complete manner.

In a further configuration of the invention, it has proven to be advantageous if a cross section of the first media-outlet passage is selected according to a tool geometry of the second tool and/or according to a relative position of the first media-outlet passage with respect to the at least one second media-outlet passage. In this case, the cross section of the first media-outlet passage is in particular selected to be as small as possible, so as to ensure particularly high stability of the hollow profile. The cross section of the first media-outlet passage is selected in such a way that the second tool can be plugged into the cavity of the hollow profile through the first media-outlet passage. Alternatively or additionally, the cross section of the first media-outlet passage is selected in such a way that the predefined relative position of the first media-outlet passage with respect to the at least one second media-outlet passage to be provided can be realized by the second media-outlet passage being formed in the profile web by means of the second tool plugged through the first media-outlet passage. In this case, the second tool may need to be set in terms of its orientation within the first media-outlet passage in order for the at least one second media-outlet passage to be formed in the profile web with the predefined relative position. The setting of the cross section of the first media-outlet passage thus makes it possible for the second media-outlet passage to be able to be formed in the profile web in the first place, since plugging of the second tool into the cavity is made possible. Furthermore, the setting of the cross section of the first media-outlet passage makes possible the provision of a predefined relative position of the at least one second media-outlet passage to be formed in the profile web with respect to the first media-outlet passage.

A further aspect of the invention relates to a method for providing a hollow profile, in which said hollow profile is in particular a motor-vehicle component. For the provision of the hollow profile, the hollow profile is extruded and a media outlet is formed in the hollow profile. Here, the media outlet is formed in the hollow profile in a method as has already been described in connection with the method according to the invention, and comprises both the first media-outlet passage and the at least one second media-outlet passage. For the production of the hollow profile, the hollow profile is produced from aluminum in the course of an aluminum extrusion process. In the method, it is provided that a geometry of the profile web is selected according to a position of the first media-outlet passage in the outer wall of the hollow profile and the hollow profile is extruded with the selected geometry of the profile web. This means that the hollow profile to be produced is designed prior to its production and, in the course of the design, the profile web is configured in terms of its position and geometry so as to be accessible to the second tool, if the second tool has been plugged into the cavity of the hollow profile through the first media-outlet passage, in order to make it possible for the at least one second media-outlet passage to be able to be formed in the profile web by means of the second tool. The geometry of the profile web is designed in particular with regard to an arrangement of its lowermost regions, for example of hollows. In this way, it can be ensured that the media outlet can be formed in the hollow profile particularly easily and, via the media outlet, the hollow profile can be freed of the medium particularly completely and quickly in that the medium flows out of the hollow profile via the media outlet.

Advantages and advantageous refinements of the method according to the invention for forming the media outlet in the hollow profile are to be regarded as advantages and advantageous refinements of the method for providing the hollow profile, and vice versa.

Certain aspects of this disclosure emerge from the claims, the figures and the description of the figure. The features and feature combinations mentioned above in the description, and the features and feature combinations mentioned below in the description of the figure and/or shown only in the figure, may be used not only in the respectively specified combination, but also in other combinations or individually.

Certain aspects will now be discussed in more detail on the basis of a preferred exemplary embodiment and with reference to the drawing.

BRIEF DESCRIPTION OF THE DRAWING

FIG. 1 shows a schematic sectional view of a hollow profile with an outer wall and with a profile web surrounded by the outer wall, and with a media outlet which comprises a first media-outlet passage, which extends through the outer wall, and a second media-outlet passage, which extends through the profile web.

DETAILED DESCRIPTION OF THE DRAWING

The sole figure (FIG. 1) illustrates a hollow profile 1 for a motor vehicle, in particular a motor car. In the present case, the hollow profile 1 is formed from aluminum. An advantage of using the hollow profile 1 in a motor vehicle is that the hollow profile 1 is of particularly lightweight and at the same time particularly stable design. For this particularly lightweight and stable design, the hollow profile 1 has in the present case a first cavity 2 and a second cavity 3, which are separated from one another by a profile web 4. The profile web 4 is peripherally enclosed by an outer wall 5 of the hollow profile 1, whereby the cavities 2, 3 are delimited. When a process, in particular coating in the course of a cathodic dip-painting operation, is carried out at a vehicle which has the hollow profile 1, a medium, in particular a liquid, can pass into the first cavity 2 and/or into the second cavity 3. In order to allow drainage of the medium from the first cavity 2 and from the second cavity 3, a media outlet 6 is provided.

In the present case, the media outlet 6 comprises a first media-outlet passage 7 and a second media-outlet passage 8. The respective media-outlet passages 7, 8 are respective openings. The outer wall 5 of the hollow profile 1 is interrupted with the first media-outlet passage 7, whereby the first cavity 2 is connected fluidically to surroundings of the hollow profile 1. The second media-outlet passage 8 interrupts the profile web 4, whereby the first cavity 2 and the second cavity 3 are connected fluidically to one another. For removal of the medium from the hollow profile 1, it is thus possible for medium situated in the second cavity 3 to flow into the first cavity 2 via the second media-outlet passage 8 and to flow out of the first cavity 2 into surroundings of the hollow profile 1, and consequently out of the hollow profile 1, via the first media-outlet passage 7.

For the purpose of forming the media outlet 6 in the hollow profile 1, the first media-outlet passage 7 is formed in the outer wall 5 with a first tool. Subsequently, a second tool is pushed into the first cavity 2 via the first media-outlet passage 7. The second media-outlet passage 8 is formed in the profile web 4 with the second tool. The respective outer dimensions of the first media-outlet passage 7, in particular a cross section of the first media-outlet passage 7, are selected according to respective outer dimensions of the second tool, so as to ensure the introduction of the second tool into the first cavity 2. The second tool is configured to form the second media-outlet passage 8 in the profile web 4 in the course of four-axis machining or in particular in the course of five-axis machining. In this way, there is particularly great flexibility with regard to a relative position of the first media-outlet passage 7 with respect to the second media-outlet passage 8, whereby respective positions of the first media-outlet passage 7 and of the second media-outlet passage 8 can be selected in such a way that the medium can flow particularly completely out of the hollow profile 1 via the media outlet 6. As a consequence of the fact that the second tool, for forming the second media-outlet passage 8 in the profile web 4, is to be pushed into the first cavity 2 via the first media-outlet passage 7, the first media-outlet passage 7 has a larger cross section than the second media-outlet passage 8. The respective cross sections of the media-outlet passages 7, 8 are freely selectable, wherein the media-outlet passages 7, 8 have a circular cross section in the present case.

For forming the media outlet 6 in the hollow profile 1, it is provided that the first media-outlet passage 7 is formed in a region of the outer wall 5, assigned to the first cavity 2, which, in the installation position of the hollow profile 1, is lowermost, so as to ensure that medium situated in the first cavity 2 flows completely out of the hollow profile 1. It is furthermore provided that the second media-outlet passage 8 is formed in the profile web 4 in a region of the profile web 4 which, in the installation position of the hollow profile 1, is lowermost, so as to allow the medium to flow particularly completely out of the second cavity 3 into the first cavity 2 and into the surroundings of the hollow profile 1 via the first media-outlet passage 7.

In the present case, the first media-outlet passage 7 and the second media-outlet passage 8 have central axes which are oblique to one another. Consequently, the tools are configured to orient the media-outlet passages 7, 8 to one another in such a way that their central axes are oblique to one another, whereby it can be ensured that the media-outlet passages 7, 8 are arranged in the respective lowermost regions of the outer wall 5 for the first media-outlet passage 7 and of the profile web 4 for the second media-outlet passage 8.

As an alternative to the embodiment shown in the sole figure, it is possible for multiple second media-outlet passages 8 to be formed in the profile web 4 with the second tool, so as to ensure that medium situated in the second cavity 3 flows completely out of the second cavity 3.

It has proven to be further advantageous if a geometry or an orientation of the profile web 4 within the hollow profile 1 is arranged in such a way that the second media-outlet passage 8 can be formed in the profile web 4 with the second tool in the state thereof in which it is plugged into the first cavity 2 via the first media-outlet passage 7. In this case, the profile web 4 is configured in particular in such a way that the second media-outlet passage 8 can be formed in that region of the profile web 4 which, in the installation position of the hollow profile 1, is lowermost. After design of the hollow profile 1 with the set geometry and orientation of the profile web 4, the hollow profile 1 is extruded from aluminum. In the present case, the hollow profile 1 is an extruded profile or a pultruded profile.

The method described for forming the media outlet 6 in the hollow profile 1 is based on the realization that complete drainage of the medium from the hollow profile 1 is to be ensured in the case of body components in order, for example in a cathodic dip-painting operation, for carry-over between media tanks to be avoided or for corrosion of the hollow profile 1, in the form of a body component, due to water standing in the cavities 2, 3 to be prevented. With the hollow profile 1, which is produced in a continuous process, the media outlet 6 is to be formed in the hollow profile 1.

In the method, the first media-outlet passage 7, which is larger in comparison with the second media-outlet passage 8, is formed in the outer wall 5 at a lowest point of a first hollow-profile chamber, which encloses the first cavity 2. Furthermore, at least one second media-outlet passage 8, which is smaller in comparison with the first media-outlet passage 7, is formed in the profile web 4. The at least one media-outlet passage 8 is placed in the profile web 4 at a lowest point of the second hollow-profile chamber, which encloses the second cavity 3, wherein a coaxial central-axis orientation of the first media-outlet passage 7 with respect to the second media-outlet passage 8 can be omitted. A size of the first media-outlet passage 7 is to be selected in such a way that the first cavity 2 is accessible to the second tool, and with second tool, the second media-outlet passage 8 can be formed in the profile web 4. In this way, it is possible to dispense with a notch at one end of the profile web 4, which notch would need to be formed by a particularly large processing machine, such as for example a milling center. This notch would have an identical function to the media-outlet passage 8 and would allow drainage of the medium from the second cavity 3. A second machining direction of the second tool for forming the second media-outlet passage 8 in the profile web 4, which second machining direction differs from a first machining direction of the first tool for forming the first media-outlet passage 7 in the outer wall 5, can be realized by the second tool, which in the present case is in the form of a four-axis processing machine or in the form of a five-axis processing machine.

In order to make it possible for the second media-outlet passage 8 to be formed in a lowermost region of the profile web 4, an inner web configuration of the profile web 4 can be adapted so as to shift the lowest point of the second hollow-profile chamber, which provides the second cavity 3, to the point where the media-outlet passage 8 can be formed in the profile web 4 particularly inexpensively and/or particularly easily.

Overall, the present disclosure shows how a cost-optimized media outlet 6 can be provided from multi-chamber profiles.

LIST OF REFERENCE SIGNS

1 Hollow profile
2 First cavity
3 Second cavity
4 Profile web
5 Outer wall
6 Media outlet
7 First media-outlet passage
8 Second media-outlet passage

What is claimed is:

1. A method for forming a media outlet in a hollow profile, comprising:
    forming a first media-outlet passage in an outer wall of the hollow profile with a first tool, wherein a medium can flow out of a cavity of the hollow profile via the first media-outlet passage, and
    introducing a second tool into the cavity of the hollow profile via the first media-outlet passage, wherein at least one second media-outlet passage is formed in an inner profile web of the hollow profile by the second tool.

2. The method according to claim 1, wherein
    the first media-outlet passage is formed in the outer wall in a lowermost region of the outer wall, and wherein
    the at least one second media-outlet passage is formed in the profile web in a lowermost region of the profile web.

3. The method according to claim 1, wherein
    the first media-outlet passage and the at least one second media-outlet passage are formed in the hollow profile with their respective central axes oblique to one another.

4. The method according to claim 1, wherein the at least one second media-outlet passage is formed in the profile web with a smaller cross section than a cross section of the first media-outlet passage in the outer wall.

5. The method according to claim 1, wherein multiple second media-outlet passages are formed in the profile web.

6. The method according to claim 1, wherein the at least one second media-outlet passage is formed in the profile web via four-axis machining or five-axis machining with the second tool.

7. The method according to claim 1, wherein a cross section of the first media-outlet passage is selected according to a tool geometry of the second tool and/or a relative position of the first media-outlet passage with respect to the at least one second media-outlet passage.

8. The method according to claim 1, further comprising: extruding the hollow profile, wherein a geometry of the profile web is selected according to a position of the first media-outlet passage and the hollow profile is extruded with the selected geometry of the profile web.

* * * * *